US005353515A

United States Patent [19]

Alvis et al.

[11] Patent Number: 5,353,515

[45] Date of Patent: Oct. 11, 1994

[54] PRECISION RIP FENCE ALIGNMENT GAUGE

[76] Inventors: Rudd A. Alvis; Paulette J. Alvis, both of 2075 Easthaven Dr., Columbus, Ohio 43232

[21] Appl. No.: 219,072

[22] Filed: Mar. 28, 1994

[51] Int. Cl.[5] ........................ B23Q 17/22; B27B 27/04

[52] U.S. Cl. ........................................ 33/640; 33/626; 33/464; 83/522.19

[58] Field of Search ................. 33/626, 630, 640, 641, 33/464; 83/522.11, 522.15, 522.16, 522.17, 522.18, 522.19, 438, 468

[56] References Cited

U.S. PATENT DOCUMENTS

| | | | |
|---|---|---|---|
| 2,808,084 | 10/1957 | Eschenburg et al. | 83/522.19 |
| 2,916,063 | 12/1959 | Boekenkamp | 83/522.18 |
| 4,825,559 | 5/1989 | Santos | 33/630 |
| 4,930,221 | 6/1990 | Taylor | 33/640 |
| 5,107,600 | 4/1992 | Riesberg | 33/640 |
| 5,207,007 | 5/1993 | Clicinotta et al. | 33/640 |

*Primary Examiner*—Thomas B. Will
*Attorney, Agent, or Firm*—Michael J. Colitz, Jr.

[57] ABSTRACT

In a table saw having a rip fence and a miter slot, a new precision rip fence alignment gauge for quickly positioning the rip fence a precise distance from the saw blade for accurately cutting a workpiece. The precision rip fence alignment gauge comprises first and second symmetrical laterally separable gauge half assemblies. Each gauge half assembly comprises an elongated flat rod with an elongated miter slot engagable locator bar slidably connected transversely thereto such that the elongated flat rod is longitudinally displaceable relative the locator bar. The elongated flat rod is constrained to an accurate 90° angle relative the locator bar with an alignment plate fixedly connected to the locator bar and slidably contacting an edge of the rod. A threaded stud projects upwardly from near an end of the locator bar and extends through a longitudinal slot through the elongated flat rod for slidably holding the edge of the rod in contact with the alignment plate. A thumbnut threadedly engages the threaded stud for locking the rod longitudinally relative the transverse locator bar. A pair of spaced apart alignment pins extends from one edge of one of the elongated bars. The pins are mateable with a corresponding pair of holes extending into the facing edge of the juxtaposed other longitudinal bar whereby the ends of the bars are aligned flush with each other. Measuring indicia may be printed on at lease one of the elongated rods.

6 Claims, 3 Drawing Sheets

PRECISION RIP FENCE ALIGNMENT GAUGE

BACKGROUND OF THE INVENTION

1. Field of the Invention

The present invention relates to power tool alignment devices and more particularly pertains to precision rip fence alignment gauges which may be adapted for quickly positioning a table saw rip fence a precise distance from the saw blade by referencing from the miter slot whereby the rip fence is maintained substantially parallel with the saw blade for accurately cutting a workpiece.

2. Description of the Prior Art

The use of power tool alignment devices is known in the prior art. More specifically, power tool alignment devices heretofore devised and utilized for the purpose of adjusting the rip fence of a table saw to obtain an accurate cut are known to consist basically of familiar, expected and obvious structural configurations, notwithstanding the myriad of designs encompassed by the crowded prior art which have been developed for the fulfillment of countless objectives and requirements.

The present invention is directed to improving devices for quickly positioning a table saw rip fence a precise distance from the saw blade for accurately cutting a workpiece in a manner which is safe, secure, economical and aesthetically pleasing.

For example, U.S. Pat. No. 4,930,221 to Taylor discloses a universal precision measuring gauge for increasing the accuracy of workpiece layout, power tool setup and workpiece marking jobs. The measuring gauge has mutually engagable positioning racks formed on facing surfaces of first and second half section body members to positively lock both a reference surface and a measuring surface rigidly and accurately in place. The displacement of one body member relative to the other body member is adjustable in predetermined increments corresponding to the spaced intervals between successive rack teeth. The tool can be used for fence alignment, depth of cut, workpiece marking and as a center finder. U.S. Pat. No. 5,207,007 to Cucinotta et al. shows a set-up tool for use with a working tool, such as a power saw, that works near a surface having a miter slot. The set-up tool includes a dial indicator and mounting members which mount the dial indicator in a measuring position above the surface. One of the mounting members fits into the miter slot on the surface. The dial indicator is moveable with respect to the mounting member that fits into the miter slot. A locking screw is provided for selectively locking the dial indicator in a desired location relative to the mounting member. Both of the devices described in the two patents above require a time consuming multi-step procedure for rip fence setup which involves alternating the device between the opposing ends of the rip fence to obtain most accurate results. Furthermore, the measurement resolution of the Taylor gauge is limited to that provided by the rack teeth spacing, and both the Taylor device and the Cucinotta tool include complex and costly parts or assemblies.

U.S. Pat. No. 5,107,600 to Riesberg describes a parallel measuring guide device for ensuring parallel measuring, alignment and minimum spacing of two objects, particularly for setting a rip fence in connection with a table saw or drill press, having a first rectangular end plate provided with at least two rods perpendicularly extending from one side thereof, a second plate movably mounted on the rods, parallel to the first end plate and capable of meeting flush therewith, the second plate is capable of being secured in position to the rods. At least one measuring scale is provided on the rods. The first plate has ribs located thereon for preventing the first plate from slipping into a miter slot, and the second plate has slots for receiving the ribs of the first plate. The measuring guide described here consists of a relatively cumbrous instrument susceptible to misalignment inaccuracy if inadvertently knocked or twisted out of shape.

The prior art also discloses a parallel ruler as shown in U.S. Pat. No. 3,427,722 to Ingram and a radial arm saw alignment device of U.S. Pat. No. 5,014,443 to Gibbens. While these devices fulfill their respective, particular objectives and requirements, the aforementioned patents do not disclose a precision rip fence alignment gauge for quickly positioning a table saw rip fence a precise distance from the saw blade by referencing from the miter slot whereby the rip fence is maintained substantially parallel with the saw blade for accurately cutting a workpiece.

In this respect, the precision rip fence alignment gauge according to the present invention substantially departs from the conventional concepts and designs of the prior art, and in so doing provides an apparatus primarily developed for the purpose of quickly positioning a table saw rip fence a precise distance from the saw blade by referencing from the miter slot whereby the rip fence is maintained substantially parallel with the saw blade for accurately cutting a workpiece.

Therefore, it can be appreciated that there exists a continuing need for new precision rip fence alignment gauge which can be used for quickly positioning a table saw rip fence a precise distance from the saw blade by referencing from the miter slot whereby the rip fence is maintained substantially parallel with the saw blade for accurately cutting a workpiece. In this regard, the present invention substantially fulfills this need.

As illustrated by the background art, efforts are continuously being made in an attempt to develop devices for adjusting the rip fence of a table saw to obtain an accurate cut. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of power tool alignment devices now present in the prior art, the present invention provides a new power tool alignment devices construction wherein the same can be utilized for quickly positioning a table saw rip fence a precise distance from the saw blade by referencing from the miter slot whereby the rip fence is maintained substantially parallel with the saw blade for accurately cutting a workpiece. As such, the general purpose of the present invention, which will be described subsequently in greater detail, is to provide a new precision rip fence alignment gauge apparatus and method which has all the advantages of the prior art power tool alignment devices and none of the disadvantages.

The invention is defined by the appended claims with the specific embodiment shown in the attached drawings. For the purpose of summarizing the invention, the invention may be incorporated into a new precision table saw rip fence alignment gauge for quickly positioning the rip fence a precise distance from the saw blade for accurately cutting a workpiece. The precision rip fence alignment gauge comprises first and second symmetrical laterally separable gauge half assemblies. The first gauge half assembly comprises an elongated flat rod having a planar top and bottom and square opposing ends. The rod also has first and second straight parallel edges. A central longitudinal slot extends nearly the entire length of the rod. The rod further has a pair of spaced apart lateral holes extending into the first edge thereof, each hole being proximal an opposing end of the rod. Measuring indicia are recorded along the top of the elongated rod, adjacent the second edge thereof. An elongated flat locator bar, having dimensions to slidably engage the miter slot of a conventional table saw, is included in the first gauge half assembly. The locator bar has a threaded stud projecting upwardly therefrom, proximal one end thereof. The threaded stud is fixedly connected to the locator bar so the longitudinal axis of the stud lies normal the plane of the locator bar. The threaded stud slidably extends through the longitudinal slot of the elongated flat rod such that the bottom of the elongated flat rod is in facing touching sliding relationship with the top of the locator bar. Further included is an alignment plate having at least one straight edge formed thereon. The bottom of the alignment plate is fixedly connected to the top of the locator bar such that the locator bar bisects the straight edge of the alignment plate at a 90° angle thereto. The straight edge of the alignment plate slidably abuts the second edge of the elongated flat rod such that, cooperatively with the threaded stud, the angular displacement of the longitudinal axes of the elongated flat rod and the locator bar is constrained to 90° while longitudinal displacement of the elongated flat rod relative the locator bar is allowed and lateral displacement of the elongated flat rod relative the locator bar is prevented. A thumbnut threadedly engages the threaded stud whereby longitudinal displacement of the elongated flat rod relative the locator bar may be prevented to lock the rod in place; and The second gauge half assembly is laterally separably connected with the first gauge half assembly. The second gauge half assembly comprises an elongated flat rod dimensionally identical to the elongated flat rod of the first gauge half assembly. The rod has a pair of spaced apart alignment pins projecting laterally from the second edge thereof. The pair of pins separably engage the pair of holes of the first gauge half assembly such that the elongated flat rods of the first and second gauge half assemblies are laterally juxtaposed, the ends of the rods being flush with each other. An elongated flat locator bar, having dimensions to slidably engage the miter slot of a conventional table saw, is further included in the second gauge half assembly. The locator bar has a threaded stud projecting upwardly therefrom, proximal one end thereof. The threaded stud is fixedly connected to the locator bar so the longitudinal axis of the stud lies normal the plane of the locator bar. The threaded stud slidably extends through the longitudinal slot of the elongated flat rod such that the bottom of the elongated flat rod is in facing touching sliding relationship with the top of the locator bar. Further included is an alignment plate having at least one straight edge formed thereon. The bottom of the alignment plate is fixedly connected to the top of the locator bar such that the locator bar bisects the straight edge of the alignment plate at a 90° angle thereto. The straight edge of the alignment plate slidably abuts the first edge of the elongated flat rod such that, cooperatively with the threaded stud, the angular displacement of the longitudinal axes of the elongated flat rod and the locator bar is constrained to 90° while longitudinal displacement of the elongated flat rod relative the locator bar is allowed and lateral displacement of the elongated flat rod relative the locator bar is prevented. A thumbnut threadedly engages the threaded stud whereby longitudinal displacement of the elongated flat rod relative the locator bar may be prevented to lock the rod in place.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a precision rip fence alignment gauge for quickly positioning a table saw rip fence a precise distance from the saw blade whereby the rip fence is maintained substantially parallel with the saw blade for accurately cutting a workpiece.

It is another object of the present invention to provide a new precision rip fence alignment gauge which may be easily and efficiently manufactured and marketed.

It is a further object of the present invention to provide a new precision rip fence alignment gauge which is of a durable and reliable construction.

An even further object of the present invention is to provide a new precision rip fence alignment gauge which is susceptible of a low cost of manufacture with regard to both materials and labor, and which accordingly is then susceptible of low prices of sale to the consuming public, thereby making such precision rip fence alignment gauges economically available to the buying public.

Still yet another object of the present invention is to provide a new precision rip fence alignment gauge which provides in the apparatuses and methods of the prior art some of the advantages thereof, while simultaneously overcoming some of the disadvantages normally associated therewith.

Still yet another object of the present invention is to provide a new precision rip fence alignment gauge that overcomes the inherent disadvantage of some prior art alignment gauges which require multiple time consuming set-up steps by providing a plurality of widely spaced positive adjustment stops for aligning the rip fence with a single step.

Yet another object of the present invention is to provide a new precision rip fence alignment gauge that permits aligning the rip fence either by taking a direct measurement with the integral scale or by comparison with a sample workpiece.

Even still another object of the present invention is to provide a new precision rip fence alignment gauge that enables even amateur users to obtain professional results.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
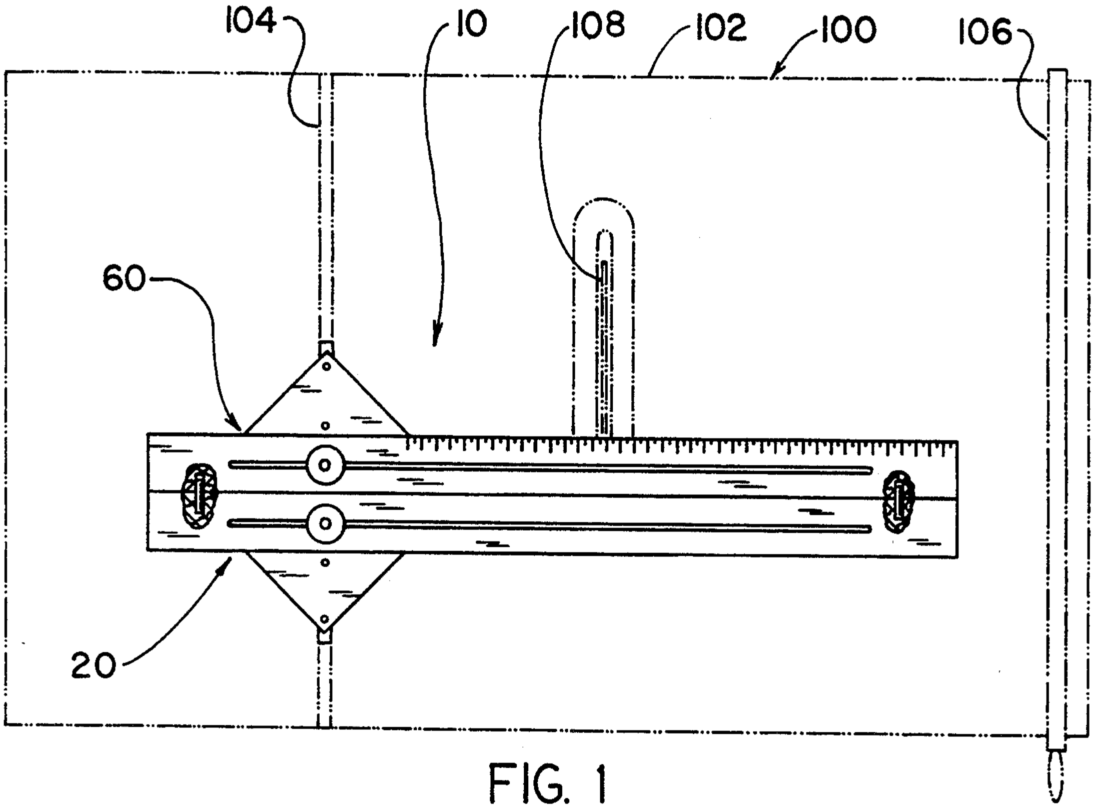
FIG. 1 is a top plan view of the new precision table saw rip fence alignment gauge illustrating its manner of preliminary adjustment on a table saw, the gauge half assemblies being juxtaposed.

With reference now to the drawings, and in particular to FIG. 1 thereof, a new precision rip fence alignment gauge embodying the principles and concepts of the present invention and generally designated by the reference numeral 10 will be described.

Figure 2:
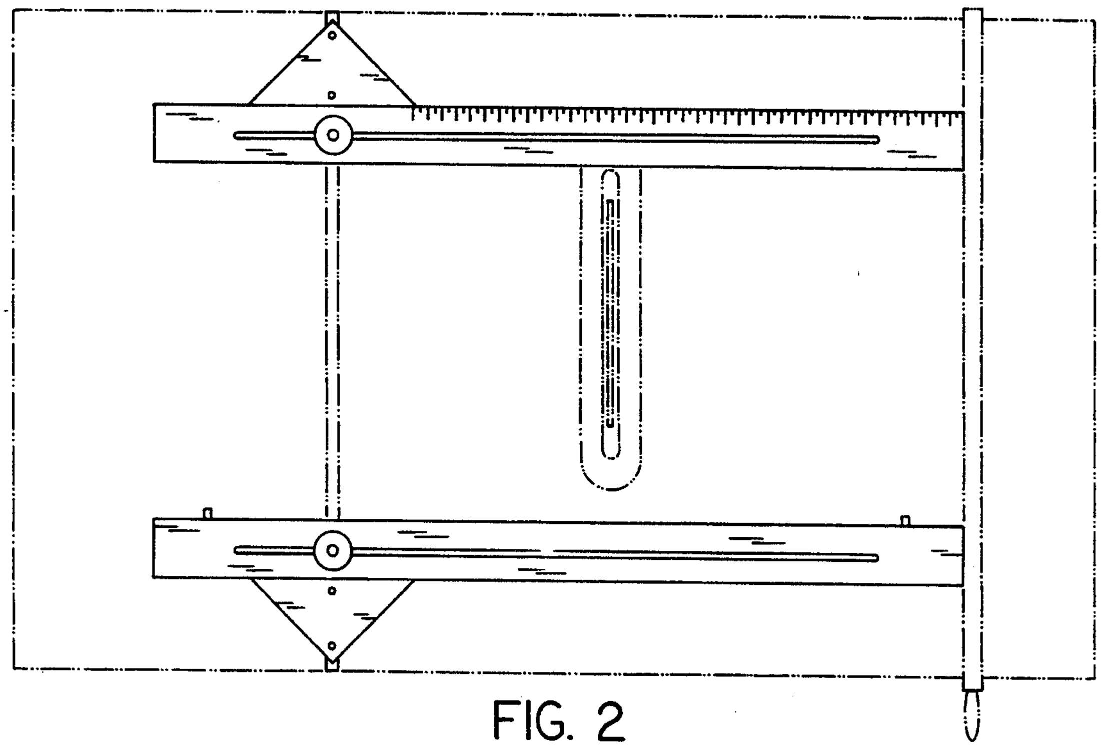
FIG. 2 is a top plan view of the invention of FIG. 1 showing the table saw rip fence being aligned against the ends of the separated gauge half assemblies.
Figure 3:
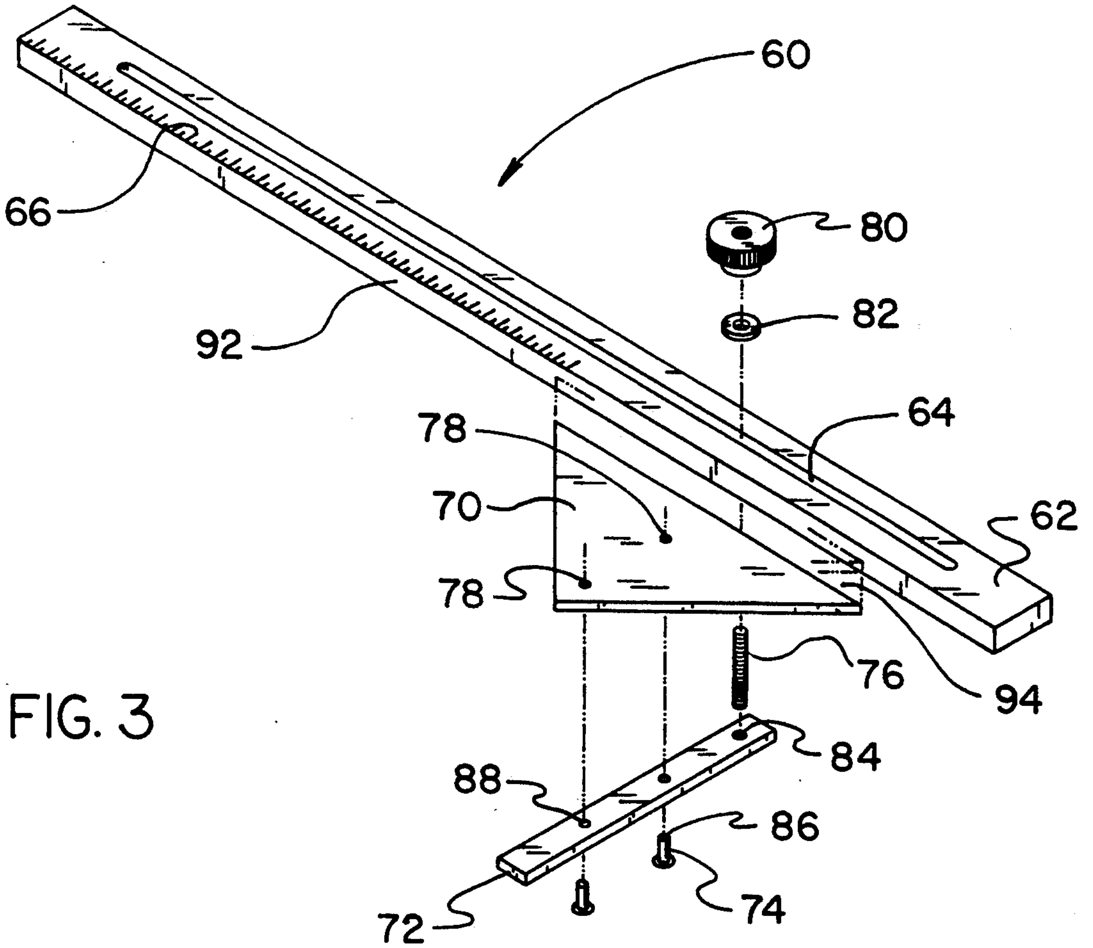
FIG. 3 is an exploded perspective view showing the first gauge half assembly of the present invention.
Figure 4:
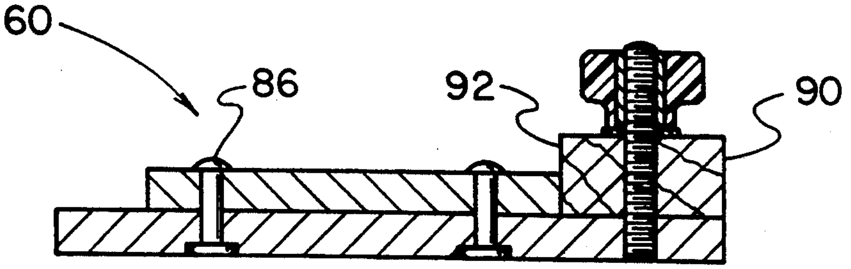
FIG. 4 is a sectional view of the assembled first gauge half assembly of FIG. 3 taken along a line cutting the longitudinal axis of the locator bar and adjacent components.
Figure 5:
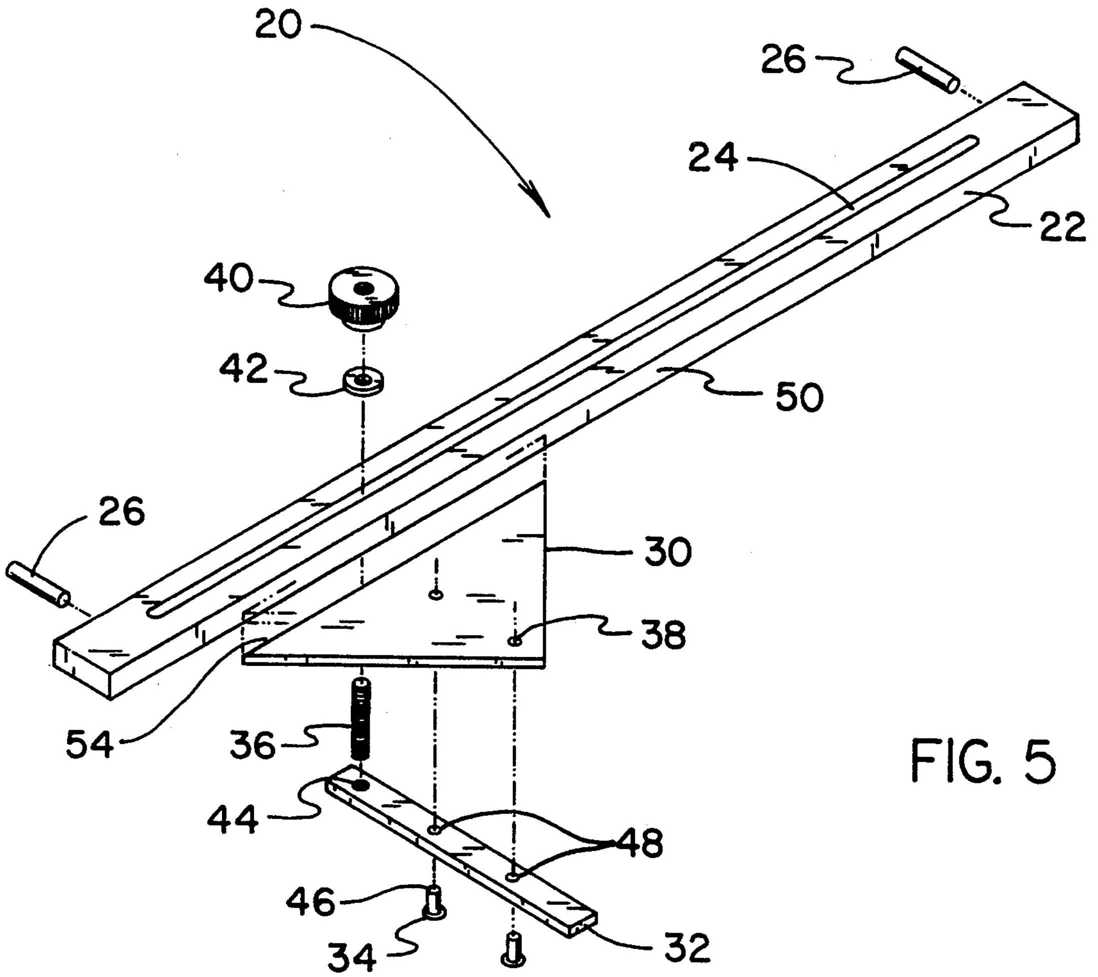
FIG. 5 is an exploded perspective view showing the second gauge half assembly of the present invention.
Figure 6:
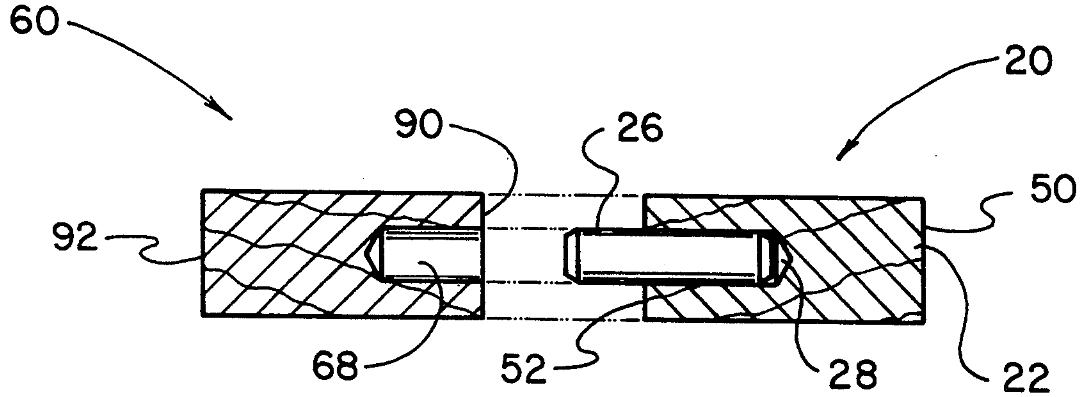
FIG. 6 is a sectional view of the assembled second gauge half assembly lying facing but spaced from the first gauge half assembly taken along a line cutting the longitudinal axis of one of the first gauge half assembly lateral holes and showing the method of mateability of the gauge half assemblies.

From an overview standpoint, the precision rip fence alignment gauge is adapted for use for quickly positioning a table saw rip fence a precise distance from the saw blade by referencing from the miter slot whereby the rip fence is maintained substantially parallel with the saw blade for accurately cutting a workpiece. See FIG. 2.

With reference now to FIGS. 1–6 and more specifically, it will be noted that a new precision rip fence alignment gauge 10 is shown. The precision rip fence alignment gauge 10 comprises first and second symmetrical laterally separable gauge half assemblies 60 and 20. The first gauge half assembly 60 comprises an elongated flat rod 62 having a planar top and bottom and square opposing ends. The rod also has first and second straight parallel edges 90 and 92. A central longitudinal slot 64 extends nearly the entire length of the rod 62. The rod 62 further has a pair of spaced apart lateral holes 68 extending into the first edge 90 thereof, each hole being proximal an opposing end of the rod 60. Measuring indicia 66 are printed along the top of the elongated rod 60, adjacent the second edge 92 thereof.

An elongated flat locator bar 72, having dimensions to slidably engage the miter slot 104 of a conventional table saw 100, is also included in the first gauge half assembly 60. The locator bar 72 has a threaded hole 84 therethrough near one end and a pair of spaced apart counterbored holes 88 therethrough intermediate the threaded hole 84 and the other end thereof. A threaded stud 76 is fixedly threadedly engaged with the threaded hole 84, projecting upwardly normal the plane of the locator bar 72. The threaded stud 76 slidably extends through the longitudinal slot 64 of the elongated flat rod 62 such that the bottom of the elongated flat rod 62 is in facing touching sliding relationship with the top of the locator bar 72.

Further included is an isosceles triangular alignment plate 70 lying in touching facing relationship over the locator bar 72, the locator bar being aligned longitudinally with the odd median of the alignment plate 70 whereby a 90° angle is formed between the locator bar 72 and the odd side 94 of the alignment plate 70. The alignment plate 70 also has a pair of spaced apart holes 78 therethrough, the holes being aligned with the spaced apart pair of counterbored holes 88 through the locator bar 72. A pair of rivets 74 extends through the counterbored holes 88 in the locator bar 72 such that the rivet heads are contained within the counterbore and flush with the bottom surface of the locator bar 72.

The rivets 74 also extend through the holes in the alignment plate 78, the plain ends 86 of the rivets 74 being swaged whereby fixedly connecting the alignment plate 70 to the locator bar 72. The odd side 94 of the alignment plate slidably abuts the second edge 92 of the elongated flat rod 62 such that, cooperating with the threaded stud 76, the angular displacement of the longitudinal axes of the elongated flat rod 62 and the locator bar 72 is constrained to 90°, while longitudinal displacement of the elongated flat rod 62 relative the locator bar 72 is allowed, and lateral displacement of the elongated flat rod 62 relative the locator bar 72 is prevented.

A thumbnut 80 threadedly engages the threaded stud 76 whereby longitudinal displacement of the elongated flat rod 62 relative the locator bar 72 may be prevented for locking the rod 62 in place. A flatwasher 82 engages the threaded stud 76, being captivated between the thumbnut 80 and the elongated flat rod 62 whereby facilitating the locking action of the thumbnut 80 and preventing marring of the top surface of the elongated flat rod 62 by the thumbnut 80.

The second gauge half assembly 20 comprises an elongated flat rod 22 dimensionally identical to the elongated flat rod 62 of the first gauge half assembly 60. The rod 62 has a pair of spaced apart alignment pins 26 projecting laterally from the second edge 52 thereof. The pair of pins 26 separably engage the pair of holes 68 of the first gauge half assembly 60 such that the elongated flat rods of the first and second gauge half assemblies 60 and 20 are laterally juxtaposed, the ends of the rods being flush with each other.

An elongated flat locator bar 32, having dimensions to slidably engage the miter slot 104 of a conventional table saw 100, is also included in the first gauge half assembly 20. The locator bar 32 has a threaded hole 44 therethrough near one end and a pair of spaced apart counterbored holes 48 therethrough intermediate the threaded hole 44 and the other end thereof. A threaded stud 36 is fixedly threadedly engaged with the threaded hole 44, projecting upwardly normal the plane of the locator bar 32. The threaded stud 36 slidably extends through the longitudinal slot 24 of the elongated flat rod 22 such that the bottom of the elongated flat rod 22 is in facing touching sliding relationship with the top of the locator bar 32. Further included is an isosceles triangular alignment plate 30 lying in touching facing relationship over the locator bar 32, the locator bar being aligned longitudinally with the odd median of the alignment plate 30 whereby a 90° angle is formed between the locator bar 32 and the odd side 54 of the alignment plate 30.

The alignment plate 30 also has a pair of spaced apart holes 38 therethrough, the holes being aligned with the spaced apart pair of counterbored holes 48 through the locator bar 32. A pair of rivets 34 extends through the counterbored holes 48 in the locator bar 32 such that the rivet heads are contained within the counterbore and flush with the bottom surface of the locator bar 32. The rivets 34 also extend through the holes in the alignment plate 38, the plain ends 46 of the rivets 34 being swaged whereby fixedly connecting the alignment plate 30 to the locator bar 32. The odd side 54 of the alignment plate slidably abuts the second edge 50 of the elongated flat rod 22 such that, cooperating with the threaded stud 36, the angular displacement of the longitudinal axes of the elongated flat rod 22 and the locator bar 32 is constrained to 90°, while longitudinal displacement of the elongated flat rod 22 relative the locator bar 32 is allowed, and lateral displacement of the elongated flat rod 22 relative the locator bar 32 is prevented.

A thumbnut 40 threadedly engages the threaded stud 36 whereby longitudinal displacement of the elongated flat rod 22 relative the locator bar 32 may be prevented for locking the rod 22 in place. A flatwasher 42 engages the threaded stud 36, being captivated between the thumbnut 40 and the elongated flat rod 22 whereby facilitating the locking action of the thumbnut 40 and preventing marring of the top surface of the elongated flat rod 22 by the thumbnut 40.

In operation, the locator bars 32 and 72 of the juxtaposed half assemblies 20 and 60 are inserted into the table saw miter slot 104 with the elongated rods 22 and 62 lying adjacent at right angles to the table saw blade 108. Both thumbnuts 40 and 80 are loosened to free the elongated rods 22 and 62, then the rods 22 and 62 are slid longitudinally until the rod ends define the desired position of the rip fence 106 relative the saw blade 108. Both thumbnuts 40 and 80 are tightened to lock the rods 22 and 62 in position. With the rods 22 and 62 locked longitudinally and the locator bars 32 and 72 engaged in the miter slot 104, the half assemblies 20 and 60 are separated by sliding the locator bars 32 and 72 away from each other until each half assembly 20 and 60 is adjacent opposing edges of the table saw table 102. The rip fence 106 is locked in position contacting the ends of both of the rods 22 and 62 thus ensuring that the rip fence 106 is parallel to and spaced precisely from the saw blade 108.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,

What is claimed is:

1. In a table saw having a rip fence and a miter slot, a new precision rip fence alignment gauge for quickly positioning the rip fence a precise distance from the saw blade by referencing from the miter slot whereby the rip fence is maintained substantially parallel with the saw blade for accurately cutting a workpiece, the precision rip fence alignment gauge comprising:

a first gauge half assembly comprising: an elongated flat rod having a planar top and bottom and square opposing ends, the rod also having first and second straight parallel edges, the rod additionally having a central longitudinal slot therethrough extending nearly the entire length thereof, the rod further having a pair of spaced apart lateral holes extending into the first edge thereof, each hole being proximal an opposing end of the rod, the rod moreover having measuring indicia recorded along the top adjacent the second edge thereof; an elongated flat locator bar having dimensions to slidably engage the miter slot of a conventional table saw, the locator bar also having a threaded stud projecting upwardly therefrom proximal one end thereof, the threaded stud being fixedly connected to the locator bar so the longitudinal axis of the stud lies normal the plane of the locator bar, the threaded stud slidably extending through the longitudinal slot of the elongated flat rod such that the bottom of the elongated flat rod is in facing touching sliding relationship with the top of the locator bar; an alignment plate having at least one straight edge formed thereon, the bottom of the alignment plate being fixedly connected to the top of the locator bar such that the locator bar bisects the straight edge of the alignment plate at a 90° angle thereto, the straight edge of the alignment plate slidably abutting the second edge of the elongated flat rod such that cooperatively with the threaded stud the angular displacement of the longitudinal axes of the elongated flat rod and the locator bar is constrained to 90° while longitudinal displacement of the elongated flat rod relative the locator bar is allowed and lateral displacement of the elongated flat rod relative the locator bar is prevented; a thumbnut threadedly engaging the threaded stud whereby longitudinal displacement of the elongated flat rod relative the locator bar may be prevented; and a second gauge half assembly laterally separably connected with the first gauge half assembly, the second gauge half assembly comprising: an elongated flat rod dimensionally identical to the elongated flat rod of the first gauge half assembly, the rod having a pair of spaced apart alignment pins projecting laterally from the first edge thereof, the pair of pins separably engaging the pair of holes of the first gauge half assembly such that the elongated flat rods of the first and second gauge half assemblies are laterally juxtaposed, the ends of the rods being flush with each other; an elongated flat locator bar, having dimensions to slidably engage the miter slot of a conventional table saw, the locator bar also having a threaded stud projecting upwardly therefrom proximal one end thereof, the threaded stud being fixedly connected to the locator bar so the longitudinal axis of the stud lies normal the plane of the locator bar, the threaded stud slidably extending through the longitudinal slot of the elongated flat rod such that the bottom of the elongated flat rod is in facing touching sliding relationship with the top of the locator bar; an alignment plate having at least one straight edge formed thereon, the bottom of the alignment plate being fixedly connected to the top of the locator bar such that the locator bar bisects the straight edge of the alignment plate at a 90° angle thereto, the straight edge of the alignment plate slidably abutting the second edge of the elongated flat rod such that cooperatively with the threaded stud the angular displacement of the longitudinal axes of the elongated flat rod and the locator bar is constrained to 90° while longitudinal displacement of the elongated flat rod relative the locator bar is allowed and lateral displacement of the elongated flat rod relative the locator bar is prevented; a thumbnut threadedly engaging the threaded stud whereby longitudinal displacement of the elongated flat rod relative the locator bar may be prevented.

2. In a table saw having a rip fence and a miter slot, a new precision rip fence alignment gauge for quickly positioning the rip fence a precise distance from the saw blade by referencing from the miter slot whereby the rip fence is maintained substantially parallel with the saw blade for accurately cutting a workpiece, the precision rip fence alignment gauge comprising:

first and second symmetrical laterally separable gauge half assemblies, each gauge half assembly comprising: an elongated rod; an elongated locator bar slidably connected transverse the elongated rod such that the elongated rod is longitudinally displaceable relative the locator bar, the locator bar being slidably engageable with the miter slot of a conventional table saw; locking means whereby longitudinal displacement of the elongated rod relative the transverse locator bar may be prevented; and alignment means whereby the ends of the elongated rods of the first and second gauge half assemblies are aligned flush with each other when the rods are laterally juxtaposed.

3. The precision rip fence alignment gauge of claim 2 wherein the elongated rods are flat, the rods having a planar top and bottom and square opposing ends, the rods also having straight parallel edges.

4. The precision rip fence alignment gauge of claim 3 wherein the locking means of each half assembly comprises: a central longitudinal slot through the elongated flat rod extending nearly the entire length thereof; a threaded stud projecting upwardly from the locator bar proximal one end thereof, the threaded stud being fixedly connected to the locator bar so the longitudinal axis of the stud lies normal the plane of the locator bar, the threaded stud slidably extending through the longitudinal slot of the elongated flat rod such that the bottom of the elongated flat rod is in facing touching sliding relationship with the top of the locator bar; and a thumbnut threadedly engaging the threaded stud whereby longitudinal displacement of the elongated flat rod relative the locator bar may be prevented.

5. The precision rip fence alignment gauge of claim 4 wherein the alignment means comprises: a pair of spaced apart lateral holes extending into one edge of the first gauge half assembly elongated flat rod, each hole being proximal an opposing end of the rod; a pair of spaced apart alignment pins projecting laterally from one edge of the second half assembly elongated flat rod, the pair of pins separably engaging the pair of holes of the first gauge half assembly such that the elongated flat rods of the first and second gauge half assemblies are laterally juxtaposed.

6. The precision rip fence alignment gauge of claim 5 and further including measuring indicia recorded along the top of at least one of the elongated flat rods.

* * * * *